(12) United States Patent
Wan et al.

(10) Patent No.: US 12,469,325 B2
(45) Date of Patent: Nov. 11, 2025

(54) FINGERPRINT SENSOR WITH WAFER-BONDED MICROLENS ARRAY

(71) Applicant: OmniVision Technologies, Inc., Santa Clara, CA (US)

(72) Inventors: Tsung-Wei Wan, Hsinchu County (TW); Wei-Ping Chen, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 725 days.

(21) Appl. No.: 17/730,688

(22) Filed: Apr. 27, 2022

(65) Prior Publication Data

US 2023/0351798 A1 Nov. 2, 2023

(51) Int. Cl.
*G06V 40/13* (2022.01)
*G02B 3/00* (2006.01)
(Continued)

(52) U.S. Cl.
CPC ....... *G06V 40/1318* (2022.01); *G02B 3/0037* (2013.01); *H10F 39/024* (2025.01);
(Continued)

(58) Field of Classification Search
CPC .............. G02B 3/0037; G06V 40/1318; H10F 39/024; H10F 39/028; H10F 39/198;
(Continued)

(56) References Cited

U.S. PATENT DOCUMENTS 9,553,126 B2   1/2017 Martin et al.
9,635,325 B2 * 4/2017 Borthakur ........... H10F 39/8063
(Continued)

FOREIGN PATENT DOCUMENTS

CN    108493215 A  *  9/2018  ......... H01L 27/3227
CN    108873119 A  *  11/2018  ............... G02B 3/00
(Continued)

OTHER PUBLICATIONS

Ma et al. "Preparation for Wafer-level Micro Polymer Lens Array With Improved Performance Using a Low Cost Glass Mold", International Symposium on Microelectronics, (IMAPS 2013), pp. 00878-00882 (Year: 2013).*

(Continued)

*Primary Examiner* — Telly D Green
(74) *Attorney, Agent, or Firm* — COZEN O'CONNOR

(57) ABSTRACT

A fingerprint sensor has an array of microlenses formed on an upper surface of a transparent substrate; with a lower surface of the transparent substrate bonded to an upper surface of a fingerprint image sensor integrated circuit. In embodiments, it includes one or two filter layers on the lower surface of the transparent substrate, and may also include masked black baffle layers on one or more of the upper and lower surface of the transparent substrate. The sensor is made by forming the microlenses and black baffle layers on the transparent substrate, then aligning the transparent substrate to a wafer of fingerprint sensor integrated circuits and bonding the transparent substrate to the wafer, then dicing the wafer into individual fingerprint sensors.

9 Claims, 4 Drawing Sheets

(51) Int. Cl.
  *H10F 39/00* (2025.01)
  *H10F 39/12* (2025.01)
(52) U.S. Cl.
  CPC ......... *H10F 39/028* (2025.01); *H10F 39/198* (2025.01); *H10F 39/805* (2025.01); *H10F 39/8057* (2025.01); *H10F 39/8063* (2025.01)
(58) Field of Classification Search
  CPC .. H10F 39/804; H10F 39/805; H10F 39/8057; H10F 39/8063
  See application file for complete search history.

(56) References Cited

U.S. PATENT DOCUMENTS

| | | | | |
|---|---|---|---|---|
| 10,147,757 | B2* | 12/2018 | Lee | H10F 39/024 |
| 11,017,200 | B1* | 5/2021 | Wickboldt | H04L 63/0861 |
| 11,869,267 | B2* | 1/2024 | Deng | G02B 3/0037 |
| 2004/0252867 | A1* | 12/2004 | Lan | G06V 40/1318 |
| | | | | 382/124 |
| 2007/0166868 | A1* | 7/2007 | Ko | H10F 39/024 |
| | | | | 438/70 |
| 2008/0224193 | A1* | 9/2008 | Kim | H10F 39/8053 |
| | | | | 257/E31.127 |
| 2013/0328151 | A1* | 12/2013 | Kao | H10F 39/024 |
| | | | | 257/443 |
| 2017/0201726 | A1* | 7/2017 | Yorikado | H10F 39/8053 |
| 2021/0042494 | A1* | 2/2021 | Xie | G06V 40/1318 |
| 2021/0185286 | A1* | 6/2021 | Pang | H04N 25/135 |
| 2021/0203872 | A1* | 7/2021 | Chen | G01B 11/24 |
| 2021/0334500 | A1* | 10/2021 | Huang | G06V 40/1318 |
| 2021/0342565 | A1* | 11/2021 | Fan | G02B 3/0056 |
| 2022/0004732 | A1* | 1/2022 | Hsieh | G02B 1/002 |
| 2022/0230011 | A1* | 7/2022 | Wan | G06V 40/1318 |
| 2022/0245374 | A1* | 8/2022 | Huang | G06V 40/1318 |
| 2022/0390657 | A1* | 12/2022 | Nakata | G02B 27/01 |
| 2023/0131591 | A1* | 4/2023 | Deng | G02B 3/0037 |
| | | | | 382/124 |
| 2023/0351798 | A1* | 11/2023 | Wan | H10F 39/8057 |

FOREIGN PATENT DOCUMENTS

| | | | | |
|---|---|---|---|---|
| CN | 109983471 A | * | 7/2019 | ........... G06K 9/0004 |
| CN | 209525659 U | * | 10/2019 | ........... G06K 9/0004 |
| CN | 110426888 A | * | 11/2019 | ......... G02F 1/13338 |
| CN | 110472618 A | * | 11/2019 | ........... A61B 5/1172 |
| CN | 210091189 U | * | 2/2020 | ........... G02B 6/0051 |
| CN | 111160325 A | * | 5/2020 | ........... G06V 10/143 |
| CN | 211087279 U | * | 7/2020 | ........... G06V 10/143 |
| CN | 111788575 A | * | 10/2020 | ........... G06K 9/0004 |
| CN | 109196525 B | * | 12/2020 | ........... G02B 6/0026 |
| CN | 109791325 B | * | 2/2022 | ........... A61B 5/1172 |
| EP | 3455768 B1 | * | 11/2021 | ......... G02F 1/13338 |
| JP | 2021177551 A | * | 11/2021 | ........... G02B 6/4204 |
| KR | 20150131944 A | * | 11/2015 | |
| KR | 20180062538 A | * | 6/2018 | |
| KR | 20190053756 A | * | 5/2019 | |
| KR | 20190100839 A | * | 8/2019 | |
| WO | WO-2020241364 A1 | * | 12/2020 | ........... A61B 5/1172 |
| WO | WO-2021161882 A1 | * | 8/2021 | ............. G02B 1/118 |

OTHER PUBLICATIONS

Popovic et al. "Technique for monolithic fabrication of microlens arrays", Applied Optics, Apr. 1, 1988, vol. 27, No. 7, pp. 1281-1284. (Year: 1988).*

* cited by examiner

FINGERPRINT SENSOR WITH WAFER-BONDED MICROLENS ARRAY

BACKGROUND

Over the past decade of smartphones, one of the clearest usability evolutions has been in how smartphones and other devices are unlocked. Unlocking operations may include typing in passcodes, fingerprint scanners, and facial recognition. A fingerprint scanner that sits underneath the screen of the device allows screens and batteries to be made as large as possible.

A fingerprint scanner may include at least a lens array bonded to an image sensor. Bonding the lens array to the image sensor is a key process that influences the optical performance of the fingerprint sensor and reduces algorithm processing time. However, the traditional bonding process is not accurate enough, because bonding a single lens array to the single image sensor may result in large errors in shift, rotation and tilt.

SUMMARY

An optical fingerprint reader has microlenses preformed on a wafer-scale transparent substrate. The transparent substrate is bonded with high precision to a top surface of a fingerprint image sensor integrated circuit configured for ball bonding, and the resulting wafer of fingerprint sensors is diced to separate individual ultrathin fingerprint sensors.

DETAILED DESCRIPTION OF THE EMBODIMENTS

Figure 1:
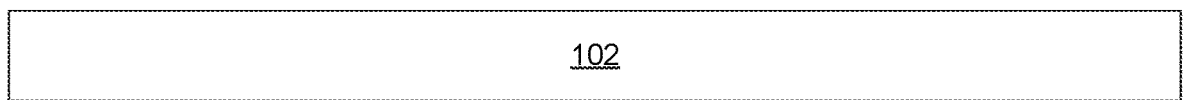
FIG. 1 is a cross-sectional illustration of a transparent substrate having an optional, masked, red or infrared optical filter deposited on its lower surface.

For purposes of this document, after depositing a layer of material, a sequence of processing steps including applying a photoresist, exposing and developing the photoresist to form a pattern on the photoresist, and etching or removing portions of the deposited material according to the pattern, is known herein as masking or patterning the layer of material.

A transparent substrate 102 (FIG. 1), which in embodiments is a glass substrate having thickness in an embodiment of 100 microns (0.1 millimeter) and in alternative embodiments between 100 and 150 microns thick, has an optional, masked, red or infrared first optical filter layer 104 deposited 202 (FIG. 8) on its lower surface. In alternative embodiments thickness is between 100 and 200 microns thick. A second, optional, red or infrared optical filter layer 106 (FIG. 2) may in some embodiments also be deposited 206 on the lower surface; in some embodiments second optical filter layer 106 has a broader passband than first optical filter layer 104 in which case it need not be masked, in alternative embodiments (not shown) optical filter layer 106 is also masked.

In embodiments, the transparent substrate 102 has dimensions including diameter similar to dimensions of a fingerprint sensor integrated circuit wafer.

Figure 8:
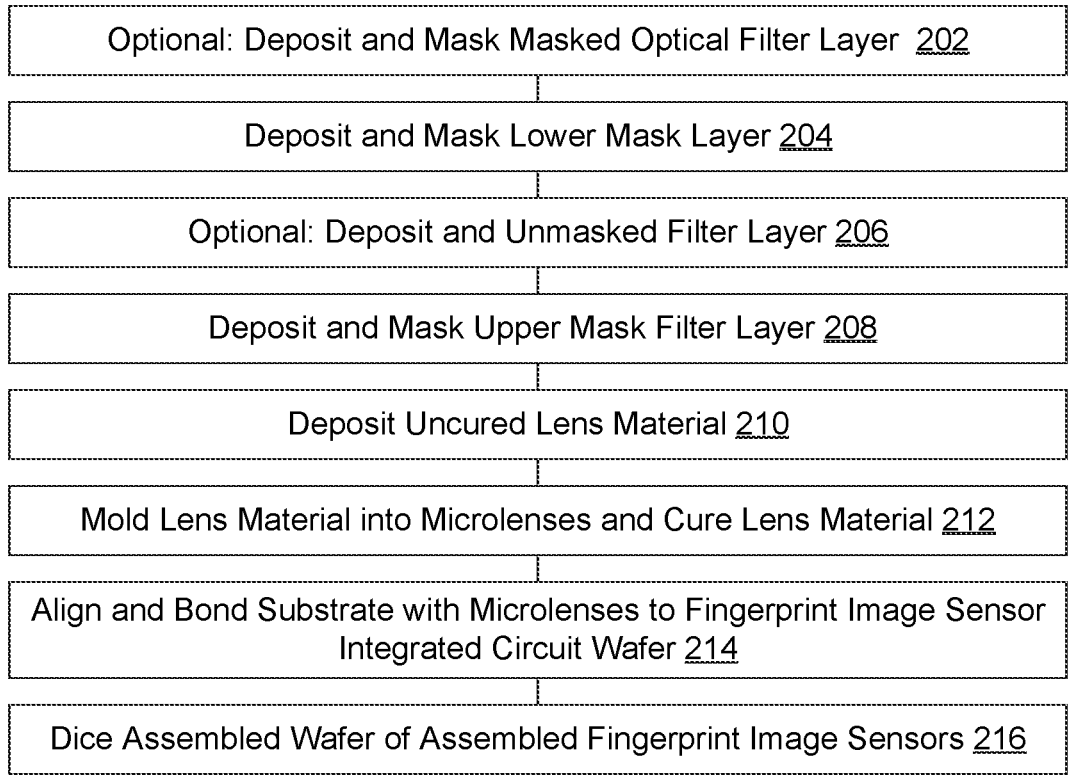
FIG. 8 is a flowchart illustrating a method of forming the transparent substrate with microlenses, bonding them to a wafer of fingerprint sensor integrated circuits, and dicing them into individual fingerprint sensors.

Also deposited 204 on the lower surface of transparent substrate 102 is a lower black masking layer 108 (FIG. 3) that is masked to provide openings 110 that will later be aligned to photodiodes or photodiode groups (as illustrated as photodiode(s) 302 in FIG. 9) of a fingerprint image sensor integrated circuit. In some embodiments, either or both of optional optical filters 104, 106 may be deposited on transparent substrate 102 before lower black masking layer 108 is deposited, however these three layers may be deposited in any order convenient for processing; in some embodiments it may be convenient to deposit unmasked optical filter layer 106 after depositing and masking both masked optical filter 104 and lower black masking layer 108 as shown in FIG. 8.

In a particular embodiment, unmasked optical filter 106 passes optical wavelengths shorter than 630 nanometers, and masked optical filter 104 passes optical wavelengths shorter than 580 nanometers. In operation, these filter layers permit a degree of color recognition of fingerprints that can be useful in distinguishing fake silicone fingers from real, live, human fingers.

On an upper surface 112 (FIG. 4) of the transparent substrate 102 an upper black masking layer 114 is deposited 208, then masked and etched to provide openings 116.

Figure 2:
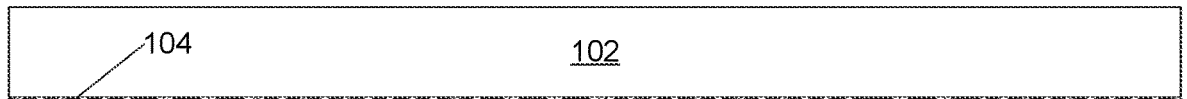
FIG. 2 is a cross-sectional illustration of the transparent substrate of FIG. 1 having a second optional red or infrared optical filter deposited on its lower surface.
Figure 3:
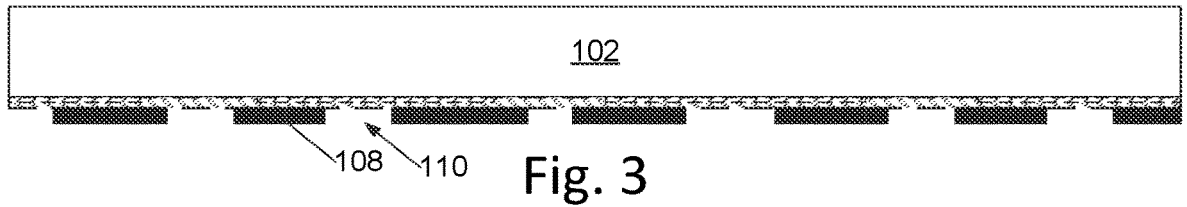
FIG. 3 is a cross-sectional illustration of the transparent substrate of FIG. 2 having a patterned black mask deposited on its lower surface along with the optional red or infrared optical filters of FIGS. 1 and 2.
Figure 4:
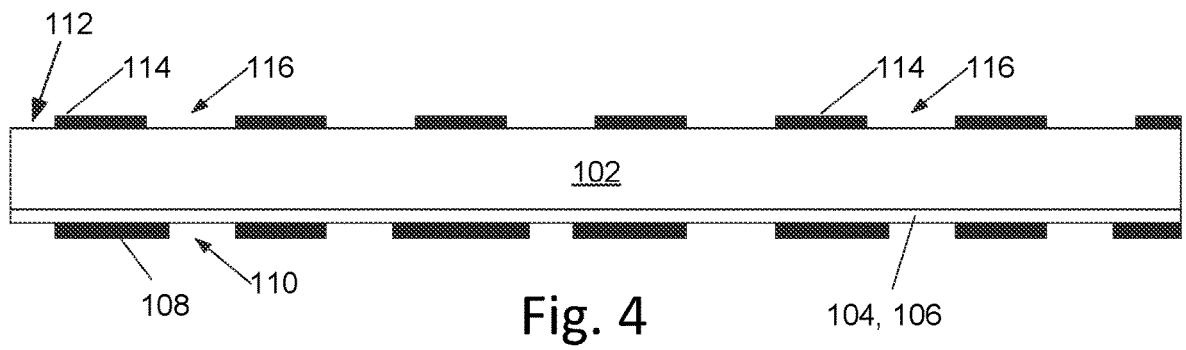
FIG. 4 is a cross-sectional illustration of a transparent substrate having an optional black mask with openings for microlenses deposited on its upper surface and a first filter on the lower surface.
Figure 5:
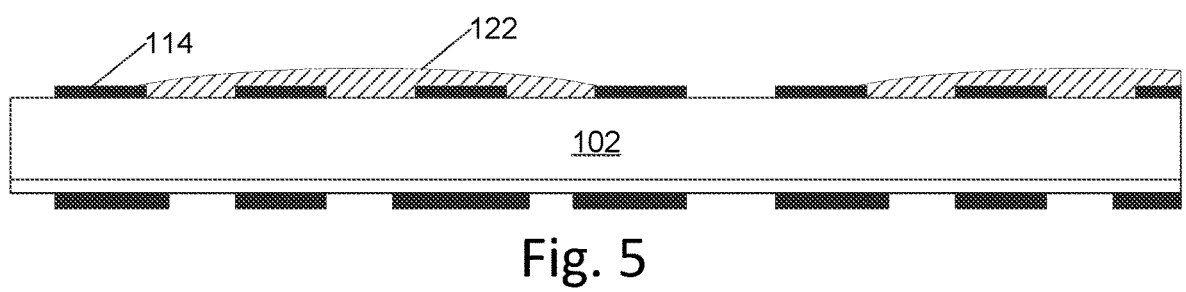
FIG. 5 is cross-sectional illustration of the transparent substrate of FIG. 4 with uncured lens material deposited over an area where microlenses will be formed on its upper surface.
Figure 6:
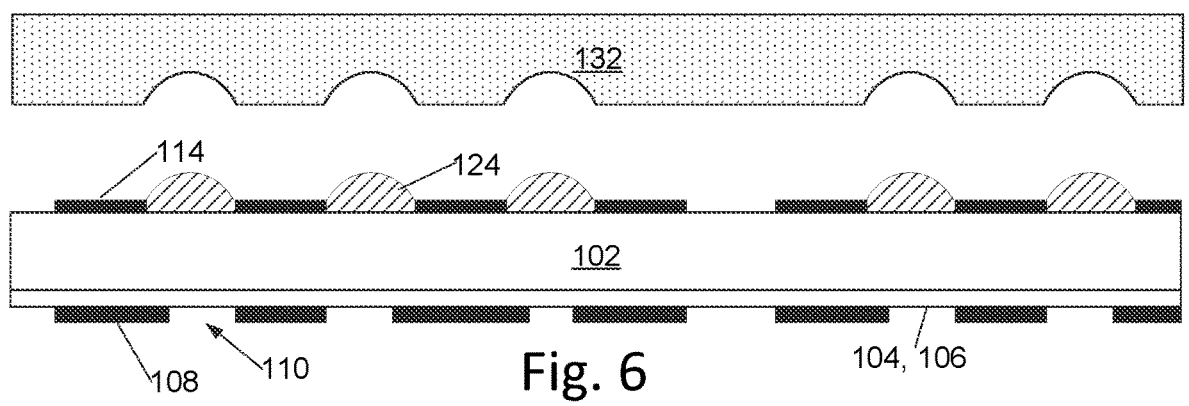
FIG. 6 is a cross-sectional illustration of the transparent substrate of FIG. 5 with the lens material formed into an array of microlenses.

In alternative embodiments, deposition of upper surface layers and shapes illustrated in FIGS. 4, 5, and 6 are done before deposition of lower surface layers illustrated in FIGS. 1, 2, and 3.

Uncured lens material 122 (FIG. 5) is then deposited 210 over an area where microlenses will be formed on the substrate 102's upper surface. A mold 132 is applied 212 and the lens material cured, in an embodiment by exposure of the lens material to ultraviolet light through mold 132, to form an array of microlenses 124 (FIG. 6).

Each patterned layer is, such as layers 104, 108, 114, and microlens mold 132, are carefully aligned to any previous patterned layers already present on the transparent substrate 102 during associated masking steps.

The completed substrate 102 of FIG. 6 with microlenses 124, masks 108, 114, and optional filters 104, 106 is then carefully aligned with and bonded to 214 a fingerprint sensor integrated circuit wafer 126 (FIG. 7) wafer to form a wafer of fingerprint sensors. In a particular embodiment the substrate 102 is aligned to the fingerprint sensor integrated circuit 126 within a three micron tolerance of an ideal location and in alternative embodiments less than 10 micron tolerances.

The assembled substrate 102 and integrated circuit wafers 126 are then diced 216 by sawing along cut lines 128 between individual integrated circuits on the integrated circuit wafer 126 to form individual fingerprint sensors 130.

The individual fingerprint sensors are then assembled into a cell phone or other electronic device, typically being located beneath an organic light emitting diode (OLED) display panel, such that the OLED panel can illuminate a finger having a fingerprint when that finger is positioned over the fingerprint sensor.

Figure 7:
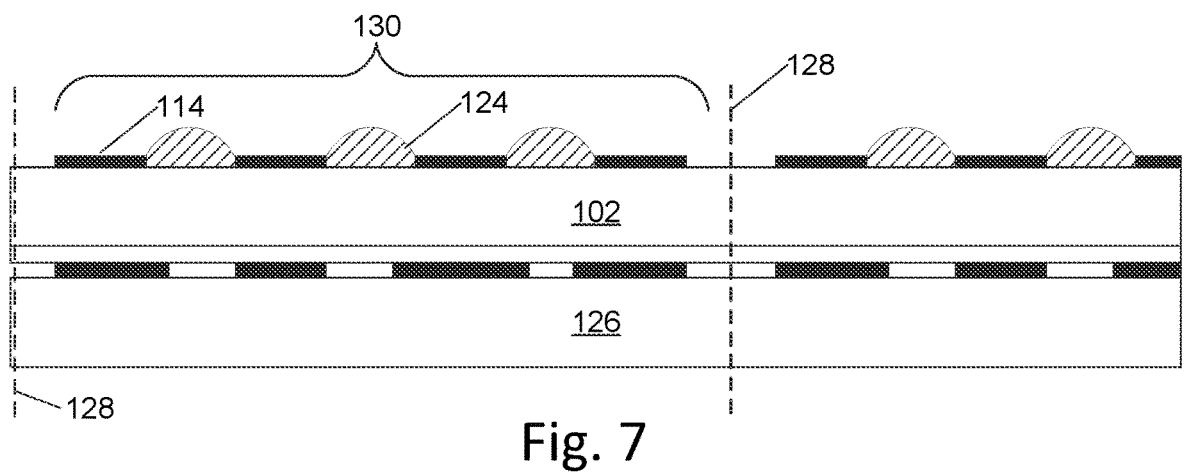
FIG. 7 is a cross-sectional illustration of the transparent substrate of FIG. 6 with microlenses, masks, and filters bonded to a wafer of fingerprint image sensor integrated circuits.
Figure 9:
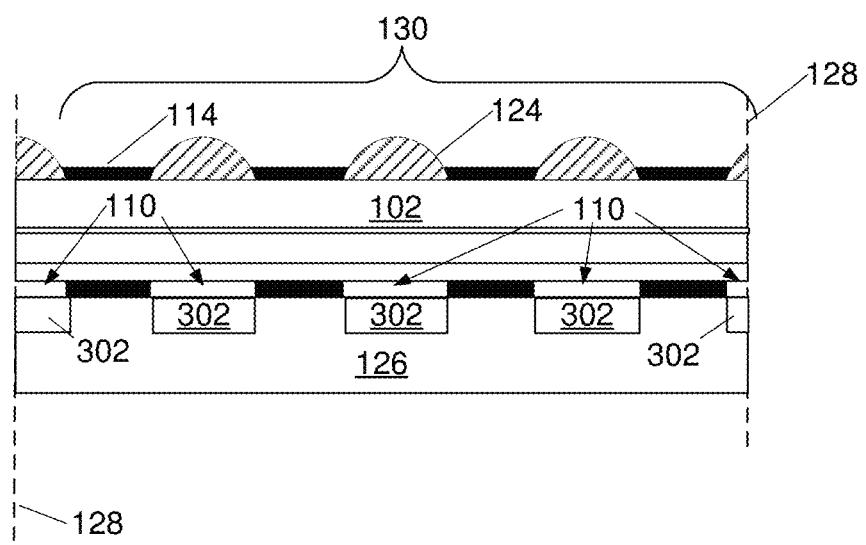
FIG. 9 is the cross-sectional illustration of FIG. 7, also illustrating the photodiode arrays of the image sensor integrated circuit together with the microlenses and mask layers.

In embodiments, as illustrated in FIG. 7 and FIG. 9, each microlens 124 of an array of microlenses associated with each fingerprint sensor is positioned at an opening 116 in the upper black mask 114 and arranged to focus light from the fingerprint through opening 116 and an associated opening 110 in the lower black mask layer and onto an image sensor comprising an associated group 302 of one or more photodiodes of the fingerprint sensor integrated circuit 126.

Through forming the microlenses and assembling the fingerprint sensors as described, within the tolerances herein described, an optical fingerprint sensor may use arrays of microlenses to observe fingerprints without requiring additional spacers between substrate 102 and the fingerprint sensor integrated circuit such as would be required when using single lenses to image a fingerprint onto an array of photodiodes in an image sensor. This permits compact assembly as is desirable in cell phones.

Combinations

The device described herein and its method of manufacture can be formed in several ways according to the following combinations:

A fingerprint sensor designated A has an array of microlenses formed on an upper surface of a transparent substrate; with a lower surface of the transparent substrate bonded to an upper surface of a fingerprint image sensor integrated circuit.

A fingerprint sensor designated AA includes the fingerprint sensor designated A and also includes a first filter layer on the lower surface of the transparent substrate.

A fingerprint sensor designated AB includes the fingerprint sensor designated AA and also includes a second filter on the lower surface of the transparent substrate, the second filter layer being patterned.

A fingerprint sensor designated AC includes the fingerprint sensor designated A, AA, or AB and also includes a black baffle layer on the upper surface of the transparent substrate, the black baffle layer having openings aligned under microlenses of the array of microlenses.

A fingerprint sensor designated AD includes the fingerprint sensor designated A, AA, AB, or AC and also includes a lower black baffle layer on the lower surface of the transparent substrate, the black baffle layer having openings aligned with photodiodes of the fingerprint sensor integrated circuit.

A fingerprint sensor designated AE includes the fingerprint sensor designated A, AA, AB, AC, or AD wherein the transparent substrate is about 0.1 millimeter thick.

A method of fabricating a fingerprint sensor designated B includes: depositing and masking an upper black mask layer on an upper surface of a transparent substrate between 100 and 200 microns thick; depositing and masking a lower black mask layer on a lower surface of the transparent substrate; depositing uncured lens material onto the upper surface of the transparent substrate; molding and curing the uncured lens material into arrays of microlenses; aligning the transparent substrate to a wafer of fingerprint sensor integrated circuits to a tolerance of less than or equal to 10 microns; bonding the transparent substrate to the wafer of fingerprint sensor integrated circuits with an array of microlenses associated with each fingerprint sensor integrated circuit to form a wafer of fingerprint sensors; and dicing the wafer of fingerprint sensors into individual fingerprint sensors.

A method of fabricating a fingerprint sensor designated BA including the method designated B where the aligning of the transparent substrate to the wafer of fingerprint sensor integrated circuits is to within a tolerance of three microns.

A method of fabricating a fingerprint sensor designated BB including the method designated B or BA further including depositing and masking a first optical filter layer.

A method of fabricating a fingerprint sensor designated BC including the method designated BB further comprising depositing a second optical filter layer.

A method of fabricating a fingerprint sensor designated BD including the method designated BC further comprising masking the second optical filter layer.

A method of fabricating a fingerprint sensor designated BE including the method designated B, BA, BB, BC, or BD where the transparent substrate is about 100 microns thick.

Changes may be made in the above system, methods or device without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A fingerprint sensor comprising:
 a plurality of microlens arrays formed on an upper surface of a transparent substrate;
 a lower surface of the transparent substrate bonded to an upper surface of an image sensor integrated circuit comprising a plurality of photodiode arrays, each photodiode array comprising a plurality of photodiodes;
 a first patterned filter layer on the lower surface of the transparent substrate;
 a second unmasked filter on the lower surface of the transparent substrate;
 wherein each microlens of the microlens array is aligned with a respective photodiode array of the image sensor integrated circuit.

2. The fingerprint sensor of claim 1 further comprising a black baffle layer on the upper surface of the transparent substrate, the black baffle layer having openings aligned under microlenses of the array of microlenses.

3. The fingerprint sensor of claim 2 further comprising a lower black baffle layer on the lower surface of the transparent substrate, the lower black baffle layer having openings each aligned with a respective photodiode array of the plurality of photodiode arrays of the image sensor integrated circuit.

4. The fingerprint sensor of claim 3 the transparent substrate being 0.1 to 0.15 millimeter thick.

5. The fingerprint sensor of claim 2 the transparent substrate being 0.1 to 0.15 millimeter thick.

6. The fingerprint sensor of claim 1 where the transparent substrate is between 0.1 mm and 0.15 mm thick.

7. The fingerprint sensor of claim 1 the first filter passing wavelengths shorter than 580 nanometers.

8. The fingerprint sensor of claim 1 the second filter passing wavelengths shorter than 630 nanometers.

9. The fingerprint sensor of claim 1 the second filter passing wavelengths shorter than 630 nanometers and the first filter passing wavelengths shorter than 580 nanometers.

* * * * *